United States Patent
Moran et al.

(10) Patent No.: US 7,610,611 B2
(45) Date of Patent: Oct. 27, 2009

(54) PRIORITIZED ADDRESS DECODER

(76) Inventors: Douglas R. Moran, 103 Boxcar Way, Folsom, CA (US) 95630; Satish Acharya, 4008 Avellano Dr., Folsom, CA (US) 95702; Zohar Bogin, 171 Wellfleet Cir., Folsom, CA (US) 95630; Sean G. Galloway, 5512 Chauncey Way, Orangevale, CA (US) 95662

( * ) Notice: Subject to any disclaimer, the term of this patent is extended or adjusted under 35 U.S.C. 154(b) by 1264 days.

(21) Appl. No.: 10/666,077

(22) Filed: Sep. 19, 2003

(65) Prior Publication Data
US 2005/0086508 A1 Apr. 21, 2005

(51) Int. Cl.
G06F 7/04 (2006.01)
G06F 17/30 (2006.01)
G06K 9/00 (2006.01)
H04L 9/32 (2006.01)

(52) U.S. Cl. ............................. 726/2; 726/16; 726/35; 713/162; 713/190; 711/147; 711/151

(58) Field of Classification Search .................. 726/2
See application file for complete search history.

(56) References Cited

U.S. PATENT DOCUMENTS

| | | |
|---|---|---|
| 3,699,532 A | 10/1972 | Schaffer et al. |
| 3,996,449 A | 12/1976 | Attanasio et al. |
| 4,037,214 A | 7/1977 | Birney et al. |
| 4,162,536 A | 7/1979 | Morley |
| 4,207,609 A | 6/1980 | Luiz et al. |
| 4,247,905 A | 1/1981 | Yoshida et al. ............... 711/166 |
| 4,276,594 A | 6/1981 | Morley |
| 4,278,837 A | 7/1981 | Best |
| 4,307,447 A | 12/1981 | Provanzano et al. |
| 4,319,233 A | 3/1982 | Matsuoka et al. |
| 4,319,323 A | 3/1982 | Ermolovich et al. |
| 4,347,565 A | 8/1982 | Kaneda et al. |
| 4,366,537 A | 12/1982 | Heller et al. |
| 4,403,283 A | 9/1983 | Myntti et al. |
| 4,419,724 A | 12/1983 | Branigin et al. |

(Continued)

FOREIGN PATENT DOCUMENTS

DE 42 17 444 A1 3/1992

(Continued)

OTHER PUBLICATIONS

Berg, Cliff , "How Do I Create a Signed Applet?", *Dr. Dobb's Journal*, (Aug. 1997),1-9.

(Continued)

*Primary Examiner*—Emmanuel L Moise
*Assistant Examiner*—Shewaye Gelagay
(74) *Attorney, Agent, or Firm*—Blakely, Sokoloff, Taylor & Zafman LLP (57) ABSTRACT

A prioritized address decoder has been disclosed. One embodiment of the prioritized address decoder includes a first comparator to compare a destination device address of data with a first address range associated with a first device and a second comparator coupled to the first comparator to compare the destination device address with a second address range associated with a second device, wherein the data is sent to the second device in response to a first output of the first comparator and a second output of the second comparator.

12 Claims, 8 Drawing Sheets

U.S. PATENT DOCUMENTS

| | | |
|---|---|---|
| 4,430,709 A | 2/1984 | Schleupen et al. |
| 4,521,852 A | 6/1985 | Guttag |
| 4,571,672 A | 2/1986 | Hatada et al. |
| 4,621,318 A | 11/1986 | Maeda ........................ 364/200 |
| 4,759,064 A | 7/1988 | Chaum |
| 4,795,893 A | 1/1989 | Ugon |
| 4,802,084 A | 1/1989 | Ikegaya et al. |
| 4,825,052 A | 4/1989 | Chemin et al. |
| 4,907,270 A | 3/1990 | Hazard |
| 4,907,272 A | 3/1990 | Hazard |
| 4,910,774 A | 3/1990 | Barakat |
| 4,975,836 A | 12/1990 | Hirosawa et al. |
| 5,007,082 A | 4/1991 | Cummins |
| 5,022,077 A | 6/1991 | Bealkowski et al. |
| 5,075,842 A | 12/1991 | Lai |
| 5,079,737 A | 1/1992 | Hackbarth ................ 711/164 |
| 5,155,829 A * | 10/1992 | Koo ........................ 711/163 |
| 5,187,802 A | 2/1993 | Inoue et al. |
| 5,230,069 A | 7/1993 | Brelsford et al. |
| 5,237,616 A | 8/1993 | Abraham et al. |
| 5,255,379 A | 10/1993 | Melo |
| 5,287,363 A | 2/1994 | Wolf et al. |
| 5,293,424 A | 3/1994 | Holtey et al. |
| 5,295,251 A | 3/1994 | Wakui et al. |
| 5,317,705 A | 5/1994 | Gannon et al. |
| 5,319,760 A | 6/1994 | Mason et al. |
| 5,361,375 A | 11/1994 | Ogi |
| 5,386,552 A | 1/1995 | Garney |
| 5,421,006 A | 5/1995 | Jablon et al. |
| 5,434,999 A | 7/1995 | Goire et al. |
| 5,437,033 A | 7/1995 | Inoue et al. |
| 5,442,645 A | 8/1995 | Ugon et al. |
| 5,455,909 A | 10/1995 | Blomgren et al. |
| 5,459,867 A | 10/1995 | Adams et al. |
| 5,459,869 A | 10/1995 | Spilo |
| 5,469,557 A | 11/1995 | Salt et al. |
| 5,473,692 A | 12/1995 | Davis |
| 5,479,509 A | 12/1995 | Ugon |
| 5,504,922 A | 4/1996 | Seki et al. |
| 5,506,975 A | 4/1996 | Onodera |
| 5,511,217 A | 4/1996 | Nakajima et al. |
| 5,522,075 A | 5/1996 | Robinson et al. |
| 5,528,231 A | 6/1996 | Patarin |
| 5,533,126 A | 7/1996 | Hazard et al. |
| 5,555,385 A | 9/1996 | Osisek |
| 5,555,414 A | 9/1996 | Hough et al. |
| 5,560,013 A | 9/1996 | Scalzi et al. |
| 5,564,040 A | 10/1996 | Kubala |
| 5,566,323 A | 10/1996 | Ugon |
| 5,568,552 A | 10/1996 | Davis |
| 5,574,936 A | 11/1996 | Ryba et al. |
| 5,582,717 A | 12/1996 | Di Santo |
| 5,604,805 A | 2/1997 | Brands |
| 5,606,617 A | 2/1997 | Brands |
| 5,615,263 A | 3/1997 | Takahashi |
| 5,628,022 A | 5/1997 | Ueno et al. |
| 5,633,929 A | 5/1997 | Kaliski, Jr. |
| 5,657,445 A | 8/1997 | Pearce |
| 5,668,971 A | 9/1997 | Neufeld |
| 5,684,948 A | 11/1997 | Johnson et al. |
| 5,706,469 A | 1/1998 | Kobayashi |
| 5,717,903 A | 2/1998 | Bonola |
| 5,720,609 A | 2/1998 | Pfefferle |
| 5,721,222 A | 2/1998 | Bernstein et al. |
| 5,729,760 A | 3/1998 | Poisner |
| 5,737,604 A | 4/1998 | Miller et al. |
| 5,737,760 A | 4/1998 | Grimmer, Jr. et al. ....... 711/163 |
| 5,740,178 A | 4/1998 | Jacks et al. |
| 5,752,046 A | 5/1998 | Oprescu et al. |
| 5,757,919 A | 5/1998 | Herbert et al. |
| 5,764,969 A | 6/1998 | Kahle |
| 5,796,835 A | 8/1998 | Saada |
| 5,796,845 A | 8/1998 | Serikawa et al. |
| 5,805,712 A | 9/1998 | Davis |
| 5,809,546 A | 9/1998 | Greenstein et al. |
| 5,825,875 A | 10/1998 | Ugon |
| 5,825,880 A | 10/1998 | Sudia et al. |
| 5,835,594 A | 11/1998 | Albrecht et al. |
| 5,844,986 A | 12/1998 | Davis |
| 5,852,717 A | 12/1998 | Bhide et al. |
| 5,854,913 A | 12/1998 | Goetz et al. |
| 5,867,577 A | 2/1999 | Patarin |
| 5,872,994 A | 2/1999 | Akiyama et al. |
| 5,890,189 A | 3/1999 | Nozue et al. |
| 5,900,606 A | 5/1999 | Rigal |
| 5,901,225 A | 5/1999 | Ireton et al. |
| 5,903,752 A | 5/1999 | Dingwall et al. |
| 5,919,257 A | 7/1999 | Trostle |
| 5,935,242 A | 8/1999 | Madany et al. |
| 5,935,247 A | 8/1999 | Pai et al. |
| 5,937,063 A | 8/1999 | Davis |
| 5,940,342 A * | 8/1999 | Yamazaki et al. ...... 365/230.03 |
| 5,944,821 A | 8/1999 | Angelo ........................ 364/200 |
| 5,953,502 A | 9/1999 | Helbig, Sr. |
| 5,956,408 A | 9/1999 | Arnold |
| 5,970,147 A | 10/1999 | Davis et al. |
| 5,978,475 A | 11/1999 | Schneier et al. |
| 5,978,481 A | 11/1999 | Ganesan et al. |
| 5,987,557 A | 11/1999 | Ebrahim |
| 6,014,745 A | 1/2000 | Ashe |
| 6,035,374 A | 3/2000 | Panwar et al. |
| 6,044,478 A | 3/2000 | Green |
| 6,055,637 A | 4/2000 | Hudson et al. |
| 6,058,478 A | 5/2000 | Davis |
| 6,061,794 A | 5/2000 | Angelo |
| 6,075,938 A | 6/2000 | Bugnion et al. |
| 6,085,296 A | 7/2000 | Karkhanis et al. |
| 6,088,262 A | 7/2000 | Nasu |
| 6,092,095 A | 7/2000 | Maytal |
| 6,093,213 A | 7/2000 | Favor et al. |
| 6,101,584 A | 8/2000 | Satou et al. |
| 6,108,644 A | 8/2000 | Goldschlag et al. |
| 6,115,816 A | 9/2000 | Davis |
| 6,125,430 A | 9/2000 | Noel et al. |
| 6,131,166 A | 10/2000 | Wong-Isley |
| 6,148,379 A | 11/2000 | Schimmel |
| 6,158,546 A | 12/2000 | Hanson et al. |
| 6,173,417 B1 | 1/2001 | Merrill |
| 6,175,924 B1 | 1/2001 | Arnold |
| 6,175,925 B1 | 1/2001 | Nardone et al. |
| 6,178,509 B1 | 1/2001 | Nardone |
| 6,182,089 B1 | 1/2001 | Ganapathy et al. |
| 6,188,257 B1 | 2/2001 | Buer |
| 6,192,455 B1 | 2/2001 | Bogin et al. |
| 6,199,152 B1 | 3/2001 | Kelly et al. |
| 6,205,550 B1 | 3/2001 | Nardone et al. |
| 6,212,635 B1 | 4/2001 | Reardon |
| 6,222,923 B1 | 4/2001 | Schwenk |
| 6,249,872 B1 | 6/2001 | Wildgrube et al. .......... 713/200 |
| 6,252,650 B1 | 6/2001 | Nakaumra |
| 6,269,392 B1 | 7/2001 | Cotichini et al. |
| 6,272,533 B1 | 8/2001 | Browne et al. .............. 709/213 |
| 6,272,637 B1 | 8/2001 | Little et al. ................. 713/194 |
| 6,275,933 B1 | 8/2001 | Fine et al. |
| 6,282,650 B1 | 8/2001 | Davis |
| 6,282,651 B1 | 8/2001 | Ashe |
| 6,282,657 B1 | 8/2001 | Kaplan et al. |
| 6,292,874 B1 | 9/2001 | Barnett ........................ 711/153 |
| 6,301,646 B1 | 10/2001 | Hostetter |
| 6,308,270 B1 | 10/2001 | Guthery et al. |
| 6,314,409 B2 | 11/2001 | Schneck et al. |
| 6,321,314 B1 | 11/2001 | Van Dyke |
| 6,327,652 B1 | 12/2001 | England et al. |
| 6,330,670 B1 | 12/2001 | England et al. |

| | | | |
|---|---|---|---|
| 6,339,815 B1 | 1/2002 | Feng | |
| 6,339,816 B1 | 1/2002 | Bausch | |
| 6,357,004 B1 | 3/2002 | Davis | |
| 6,363,485 B1 | 3/2002 | Adams | |
| 6,374,286 B1 | 4/2002 | Gee et al. | |
| 6,374,317 B1 | 4/2002 | Ajanovic et al. | 710/105 |
| 6,378,068 B1 | 4/2002 | Foster | |
| 6,378,072 B1 | 4/2002 | Collins et al. | |
| 6,389,537 B1 | 5/2002 | Davis et al. | |
| 6,397,242 B1 | 5/2002 | Devine et al. | |
| 6,397,379 B1 | 5/2002 | Yates, Jr. et al. | |
| 6,412,035 B1 | 6/2002 | Webber | |
| 6,421,702 B1 | 7/2002 | Gulick | |
| 6,435,416 B1 | 8/2002 | Slassi | |
| 6,445,797 B1 | 9/2002 | McGough et al. | |
| 6,463,535 B1 | 10/2002 | Drews et al. | |
| 6,463,537 B1 | 10/2002 | Tello | |
| 6,499,123 B1 | 12/2002 | McFarland et al. | |
| 6,505,279 B1 | 1/2003 | Phillips et al. | |
| 6,507,904 B1 | 1/2003 | Ellison et al. | |
| 6,529,909 B1 | 3/2003 | Bowman-Amuah | |
| 6,535,988 B1 | 3/2003 | Poisner | |
| 6,557,104 B2 | 4/2003 | Vu et al. | |
| 6,560,627 B1 | 5/2003 | McDonald et al. | |
| 6,609,199 B1 | 8/2003 | DeTreville | |
| 6,615,278 B1 | 9/2003 | Curtis | |
| 6,633,963 B1 | 10/2003 | Ellison et al. | |
| 6,633,981 B1 | 10/2003 | Davis | |
| 6,651,171 B1 | 11/2003 | England et al. | |
| 6,678,825 B1 | 1/2004 | Ellison et al. | |
| 6,684,326 B1 | 1/2004 | Cromer et al. | |
| 2001/0021969 A1 | 9/2001 | Burger et al. | |
| 2001/0027511 A1 | 10/2001 | Wakabayashi et al. | |
| 2001/0027527 A1 | 10/2001 | Khidekel et al. | |
| 2001/0037450 A1 | 11/2001 | Metlitski et al. | |
| 2002/0007456 A1 | 1/2002 | Peinado et al. | |
| 2002/0023032 A1 | 2/2002 | Pearson et al. | |
| 2002/0147916 A1 | 10/2002 | Strongin et al. | |
| 2002/0166061 A1 | 11/2002 | Falik et al. | |
| 2002/0169717 A1 | 11/2002 | Challener | |
| 2003/0018892 A1 | 1/2003 | Tello | |
| 2003/0074548 A1 | 4/2003 | Cromer et al. | |
| 2003/0115453 A1 | 6/2003 | Grawrock | |
| 2003/0126442 A1 | 7/2003 | Glew et al. | |
| 2003/0126453 A1 | 7/2003 | Glew et al. | |
| 2003/0159056 A1 | 8/2003 | Cromer et al. | |
| 2003/0188179 A1 | 10/2003 | Challener et al. | |
| 2003/0196085 A1 | 10/2003 | Lampson et al. | |
| 2004/0117539 A1 | 6/2004 | Bennett et al. | |

FOREIGN PATENT DOCUMENTS

| | | |
|---|---|---|
| EP | 0 473 913 A2 | 3/1992 |
| EP | 0 600 112 A1 | 6/1994 |
| EP | 0 602 867 A1 | 6/1994 |
| EP | 0 892 521 A2 | 1/1999 |
| EP | 0 930 567 A2 | 7/1999 |
| EP | 0 961 193 A2 | 12/1999 |
| EP | 0 965 902 A2 | 12/1999 |
| EP | 1 030 237 A1 | 8/2000 |
| EP | 1 055 989 A1 | 11/2000 |
| EP | 1 056 014 A1 | 11/2000 |
| EP | 1 085 396 A1 | 3/2001 |
| EP | 1 146 715 A1 | 10/2001 |
| EP | 1 209 563 A2 | 5/2002 |
| EP | 1 271 277 A2 | 1/2003 |
| JP | 2000-076139 | 3/2000 |
| WO | WO 95/24696 | 9/1995 |
| WO | WO 97/29567 | 8/1997 |
| WO | WO 98/12620 | 3/1998 |
| WO | WO 98/34365 | 8/1998 |
| WO | WO 98/44402 | 10/1998 |
| WO | WO 99/05600 | 2/1999 |
| WO | WO 99/09482 | 2/1999 |
| WO | WO 99/18511 | 4/1999 |
| WO | WO 99/57863 | 11/1999 |
| WO | WO 99/65579 | 12/1999 |
| WO | WO 00/21238 | 4/2000 |
| WO | WO 00/62232 | 10/2000 |
| WO | WO 01/27723 A1 | 4/2001 |
| WO | WO 01/27821 A2 | 4/2001 |
| WO | WO 01/63994 A2 | 8/2001 |
| WO | WO 01/75564 A2 | 10/2001 |
| WO | WO 01/75565 A2 | 10/2001 |
| WO | WO 01/75595 A2 | 10/2001 |
| WO | WO 02/01794 A2 | 1/2002 |
| WO | WO 02/17555 A2 | 2/2002 |
| WO | WO 02/060121 A1 | 8/2002 |
| WO | WO 02/086684 A2 | 10/2002 |
| WO | WO 03/058412 A2 | 7/2003 |

OTHER PUBLICATIONS

Brands, Stefan , "Restrictive Blinding of Secret-Key Certificates", *Springer-Verlag* XP002201306, (1995),Chapter 3.

Chien, Andrew A., et al., "Safe and Protected Execution for the Morph/AMRM Reconfigurable Processor", *7th Annual IEEE Symposium, FCCM '99 Proceedings*, XP010359180, ISBN 0-7695-0375-6, Los Alamitos, CA, (Apr. 21, 1999),209-221.

Compaq Computer Corporation, "Trusted Computing Platform Alliance (TCPA) Main Specification Version 1.1a", XP002272822, (Jan. 25, 2001),1-321.

Coulouris, George , et al., "Distributed Systems, Concepts and Designs", *2nd Edition*, (1994),422-424.

Crawford, John , "Architecture of the Intel 80386", *Proceedings of the IEEE International Conference on Computer Design: VLSI in Computers and Processors (ICCD '86)*, (Oct. 6, 1986),155-160.

Davida, George I., et al., "Defending Systems Against Viruses through Cryptographic Authentication", *Proceedings of the Symposium on Security and Privacy*, IEEE Comp. Soc. Press, ISBN 0-8186-1939-2,(May 1989).

Fabry, R.S. , "Capability-Based Addressing", Fabry, R.S., "*Capability-Based.Addressing,*" *Communications of the ACM*, vol. 17, No. 7 (Jul. 1974),403-412.

Frieder, Gideon , "The Architecture And Operational Characteristics of the VMX Host Machine", *The Architecture And Operational Characteristics of the VMX Host Machine, IEEE*, (1982),9-16.

Goldberg, Robert P., "Survey of Virtual Machine Research", *Computer Magazine*, (Jun. 1974),34-35.

Gong, Li , et al., "Going Behond the Sandbox: An Overview of the New Security Architecture in the Java Development Kit 1.2", *Proceedings of the USENIX Symposium on Internet Technologies and Systems*, Monterey, CA,(Dec. 1997).

Gum, P. H., "System/370 Extended Architecture: Facilities for Virtual Machines", *IBM J. Research Development*, vol. 27, No. 6, (Nov. 1983),530-544.

Heinrich, Joe , "MIPS R4000 Microprocessor User's Manual, Second Edition", *Chapter 4 "Memory Management"*, (Jun. 11, 1993),61-97.

HP Mobile Security Overview, "HP Mobile Security Overview", (Sept. 2002),1-10.

IBM, "Information Display Technique for a Terminate Stay Resident Program IBM Technical Disclosure Bulletin", TDB-ACC-No. NA9112156, vol. 34, Issue 7A, (Dec. 1, 1991),156-158.

IBM Corporation, "IBM ThinkPad T30 Notebooks", *IBM Product Specification*, located at www-1.ibm.com/services/files/cisco_t30_spec_sheet_070202.pdf, last visited Jun. 23, 2004,(Jul 2, 2002),1-6.

Intel, "IA-32 Intel Architecture Software Developer's Manual", vol. 3: *System Programming Guide*, Intel Corporation—2003, 13-1 through 13-24.

Intel, "Intel386 DX Microprocessor 32-Bit CHMOS Microprocessor With Integrated Memory Management", (1995),5-56.

Intel Corporation, "IA-64 System Abstraction Layer Specification", *Intel Product Specification*, Order No. 245359-001, (Jan. 2000),1-112.

Intel Corporation, "Intel 82802AB/82802AC Firmware Hub (FWH)", *Intel Product Datasheet*, Document No. 290658-004,(Nov. 2000),1-6, 17-28.

Intel Corporation, "Intel IA-64 Architecture Software Developer's Manual", vol. 2: *IA-64 System Architecture*, Order No. 245318-001, (Jan. 2000),i, ii, 5.1-5.3, 11.1-11.8, 11.23-11.26.

Karger, Paul A., et al., "A VMM Security Kernal for the VAX Architecture", *Proceedings of the Symposium on Research in Security and Privacy*, XP010020182, ISBN 0-8186-2060-9, Boxborough, MA, (May 7, 1990),2-19.

Kashiwagi, Kazuhiko , et al., "Design and Implementation of Dynamically Reconstructing System Software", *Software Engineering Conference*, Proceedings 1996 Asia-Pacific Seoul, South Korea Dec. 4-7, 1996, Los Alamitos, CA USA, IEEE Comput. Soc, US, ISBN 0-8186-7638-8,(1996).

Lawton, Kevin , et al., "Running Multiple Operating Systems Concurrently on an IA32 PC Using Virtualization Techniques", http://www.plex86.org/research/paper.txt, (Nov. 29, 1999),1-31.

Luke, Jahn , et al., "Replacement Strategy for Aging Avionics Computers", *IEEE AES Systems Magazine*, XP002190614,(Mar. 1999).

Menezes, Alfred J., et al., "Handbook of Applied Cryptography", *CRC Press Series on Discrete Mathematics and its Applications*, Boca Raton, FL, XP002165287, ISBN 0849385237,(Oct. 1996),403-405, 506-515, 570.

Menezes, Alfred J., et al., "Handbook of Applied Cryptography", *CRC Press LLC*, USA XP002201307, (1997),475.

Motorola, "M68040 User's Manual", (1993),1-1 to 8-32.

Nanba, S. , et al., "VM/4: ACOS—4 Virtual Machine Architecture", *VM/4: ACOS—4 Virtual Machine Architecture, IEEE*, (1985),171-178.

Richt, Stefan , et al., "In-Circuit-Emulator Wird Echtzeittauglich", *Elektronic, Franzis Verlag GMBH*, Munchen, DE, vol. 40, No. 16, XP000259620,(100-103),Aug. 6, 1991.

Robin, John S., et al., "Analysis of the Pentium's Ability to Support a Secure Virtual Machine Monitor", *Proceedings of the 9th USENIX Security Symposium*, XP002247347, Denver, Colorado, (Aug. 14, 2000),1-17.

Rosenblum, M. , "Virtual Platform: A Virtual Machine Monitor for Commodity PC", *Proceedings of the 11th Hotchips Conference*, (Aug. 17, 1999),185-196.

RSA Security, "Hardware Authenticators", www.rsasecurity.com/node.asp.?id=1158, 1-2.

RSA Security, "RSA SecurID Authenticators", www.rsasecurity.com/products/securid/datasheets/SID_DS_0103.pdf, 1-2.

RSA Security, "Software Authenticators", www.srasecurity.com/node.asp?id=1313, 1-2.

Saez, Sergio , et al., "A Hardware Scheduler for Complex Real-Time Systems", *Proceedings of the IEEE International Symposium on Industrial Electronics*, XP002190615,(Jul. 1999),43-48.

Schneier, Bruce , "Applied Cryptography: Protocols, Algorithm, and Source Code in C", *Wiley, John & Sons, Inc.*, XP002939871; ISBN 0471117099,(Oct. 1995),47-52.

Schneier, Bruce , "Applied Cryptography: Protocols, Algorithm, and Source Code in C", *Wiley, John & Sons, Inc.*, XP002138607; ISBN 0471117099,(Oct. 1995),56-65.

Schneier, Bruce , "Applied Cryptography: Protocols, Algorithms, and Source Code C", *Wiley, John & Sons, Inc.*, XP0021111449; ISBN 0471117099,(Oct. 1995),169-187.

Schneier, Bruce , "Applied Cryptography: Protocols, Algorithms, and Source Code in C", *2nd Edition; Wiley, John & Sons, Inc.*, XP002251738; ISBN 0471128457,(Nov. 1995),28-33; 176-177; 216-217; 461-473; 518-522.

Sherwood, Timothy , et al., "Patchable Instruction ROM Architecture", *Department of Computer Science and Engineering*, University of California, San Diego, La Jolla, CA, (Nov. 2001).

* cited by examiner

Prior Art

PRIORITIZED ADDRESS DECODER

FIELD OF INVENTION

The present invention relates to computer systems, and more particularly, to data security in a computer system.

BACKGROUND

In a typical computer system, a memory controller or a memory controller hub (MCH) routes data in between various devices within the computer system, such as, a processor, a main memory, a graphics chip, a peripheral device, etc. Some of the devices of the computer system are referred to as trusted agents because it is safe to send secured data to these devices. For example, the Central Processing Unit (CPU) is a trusted agent in one computer system. The remaining devices are referred to as non-trusted agents.

The MCH in the computer system allows software to allocate memory space in a memory map for various devices in the computer system. When the computer system is initialized, the basic input/output software (BIOS) programs a set of configuration registers in the MCH to define a memory map for the computer system.

Figure 1:
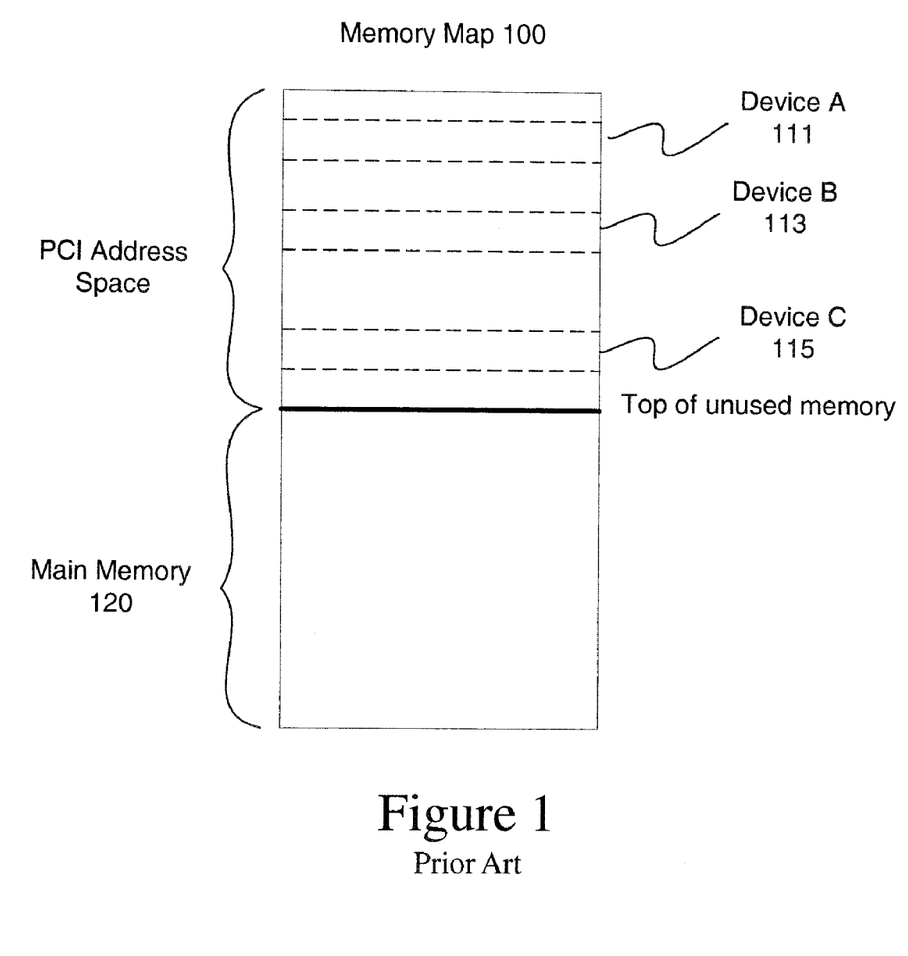
FIG. 1 shows an example of a memory map.

FIG. 1 shows an example of the memory map 100. The bottom portion 120 of the memory map 100 is assigned to the main memory of the computer system. Memory portions 111, 113, and 115 are respectively assigned to devices A, B, and C of the computer system. Usually, the portions of the memory map for the devices do not overlap with each other or with the portion for the main memory. To route data within the computer system, the MCH decodes the destination address of the data to determine in which device's address range the destination address falls into. Then the MCH routes the data to that device.

Figure 2:
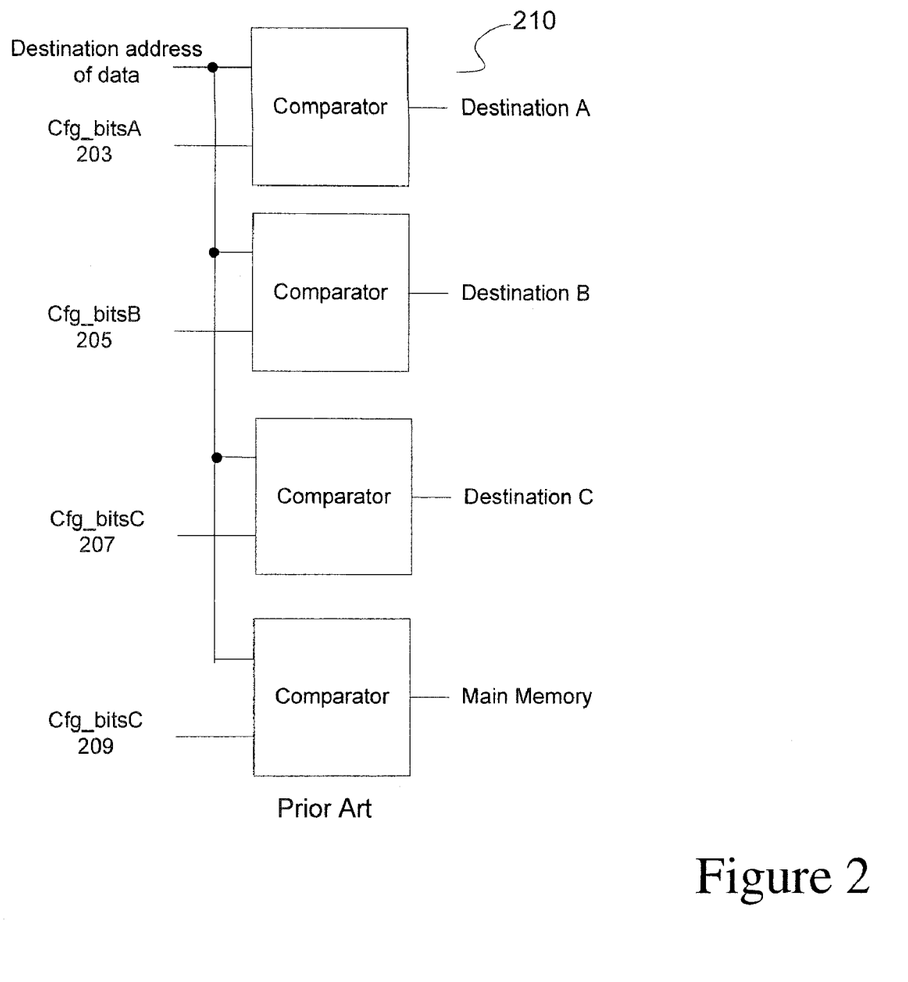
FIG. 2 shows an existing address decoder.
Figure 3:
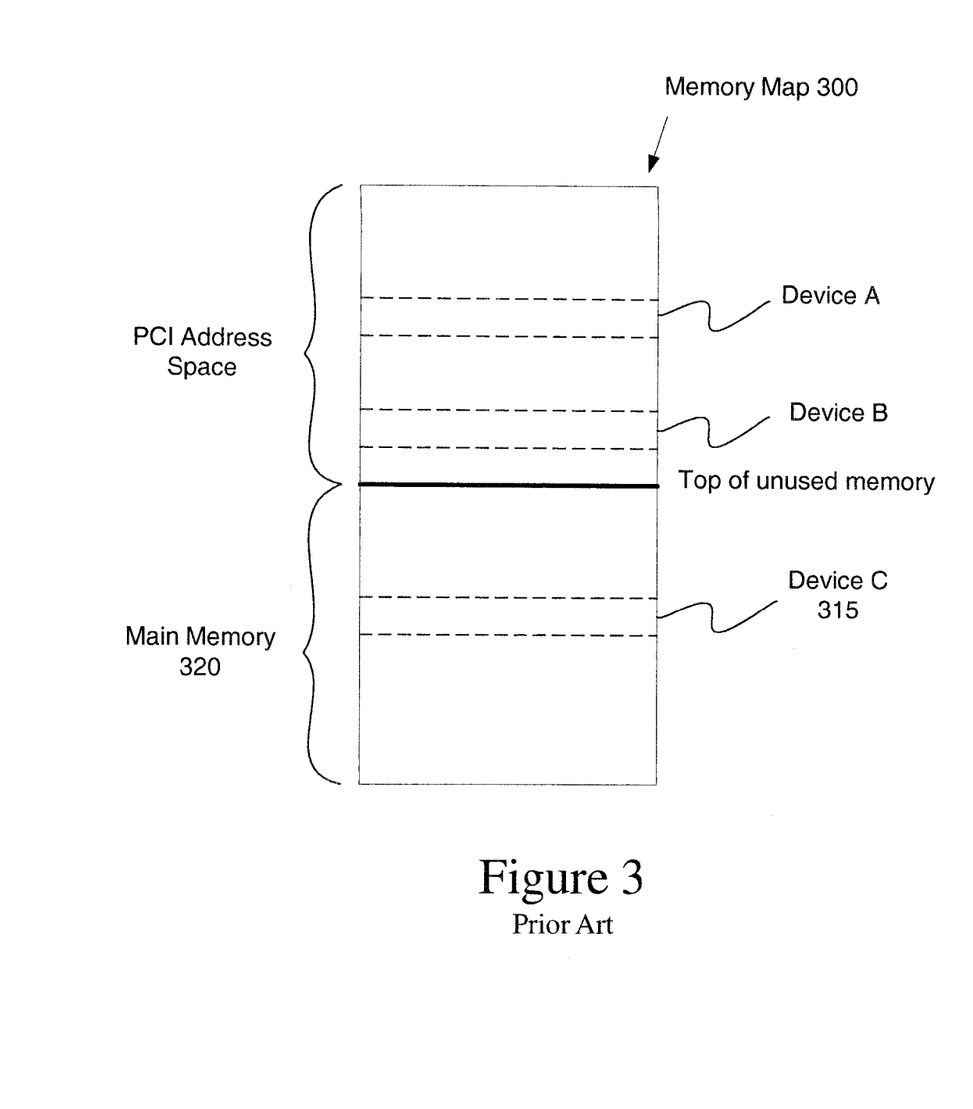
FIG. 3 shows another example of a memory map.

An existing address decoder in a MCH is shown in FIG. 2. The address decoder includes a number of address comparators 210 connected in parallel. Each comparator compares the destination address of the data with an address range of a device within the system. The values of cfg_bitsA 203, cfg_bitsB 205, and cfg_bitsC 207 represent the address ranges of devices A, B, and C respectively. The address range of the main memory is represented by cfg_bitsN 209. If the destination address falls within the address range of a device, the corresponding comparator outputs a signal to enable the MCH to route the data to the device. Since each comparator is independent of the other comparators, the same data may be written to multiple devices when the address ranges of the multiple devices overlap with each other and the destination address falls into the overlapped range. For example, referring to the memory map 300 in FIG. 3, the address range of device C 315 overlaps with the address range of the main memory 320. When the destination address of the data falls within the overlapping address range 315, the data is written to both the main memory and device C.

Some software may be used to exploit the fact that data is sent to multiple locations when address ranges overlap in order to steal secured data from the computer system. For example, the software reprograms the address range of a non-trusted agent, e.g., a peripheral device, to overlap with the address range of a trusted agent. When the trusted agent accesses the secured data, the non-trusted agent receives the secured data as well if the destination address of the secured data falls into the address range shared by both the trusted agent and the non-trusted agent. However, it is impractical to bar reprogramming of the address ranges of peripheral devices because other legitimately operating software applications may reprogram the address ranges from time to time.

BRIEF DESCRIPTION OF THE DRAWINGS

The present invention will be understood more fully from the detailed description that follows and from the accompanying drawings, which however, should not be taken to limit the appended claims to the specific embodiments shown, but are for explanation and understanding only.

DETAILED DESCRIPTION

In the following description, numerous specific details are set forth. However, it is understood that embodiments of the invention may be practiced without these specific details. In other instances, well-known circuits, structures, and techniques have not been shown in detail in order not to obscure the understanding of this description.

Figure 4A:
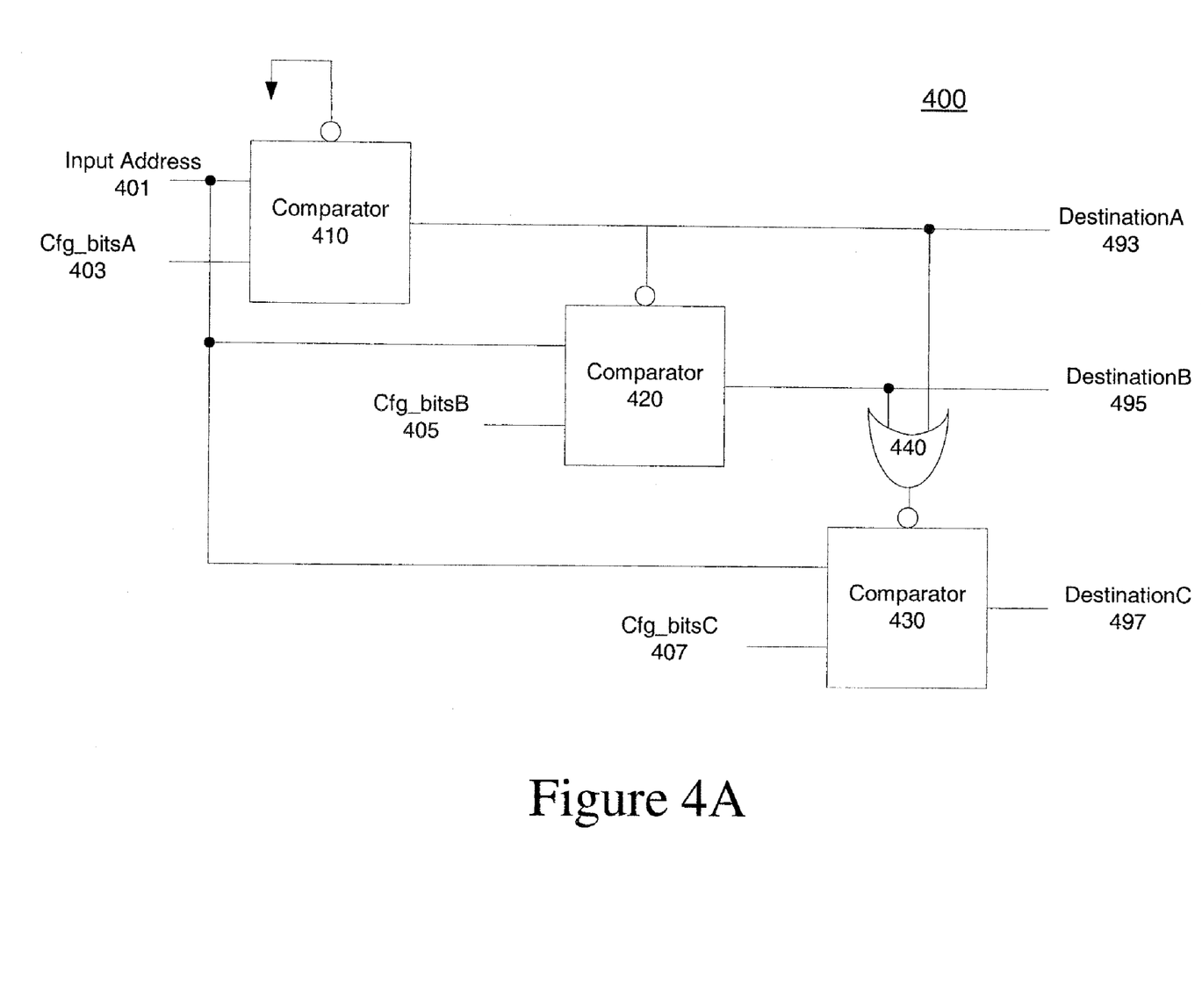
FIG. 4A shows one embodiment of a prioritized address decoder.

FIG. 4A shows one embodiment of a prioritized address decoder 400. The prioritized address decoder 400 may be part of a MCH in a computer system. In one embodiment, the decoder 400 includes 3 address comparators 410-430 and an OR gate 440. The address comparators 410-430 compare an input address 401 with cfg_bitsA 403, cfg_bitsB 405, and cfg_bitsC 407, respectively. In one embodiment, the input address 401 is the destination address of the data to be sent to a device of the computer system. In one embodiment, cfg_bitsA 403, cfg_bitsB 405, and cfg_bitsC 407 correspond respectively to the address ranges of devices A, B, and C within the computer system. Examples of devices A, B, and C include the main memory, the graphics chip, etc. In one embodiment, cfg_bitsA 403, cfg_bitsB 405, and cfg_bitsC 407 are stored in a number of configuration registers in, or accessible by, the MCH during configuration of the computer system. In one embodiment, the values of cfg_bitsA 403, cfg_bitsB 405, and cfg_bitsC 407 may be modified by software after configuration.

Referring to FIG. 4A, the output of the comparator 410 is coupled to a select input of the comparators 420 and 430. If the input address 401 falls within the address range corresponding to device A, then the output of the comparator 410, DestinationA 493, goes high to allow the data to go to device A. Also, the output of the comparator 410 at high disables the remaining comparators 420 and 430 so that the data would not be sent to device B or device C.

In one embodiment, if the input address 401 does not fall within the address range of device A, the output of the comparator 410, DestinationA 493, goes low to prevent the data from going to device A and enables the comparator 420. When the comparator 420 is enabled, the comparator 420 compares the input address 401 with cfg_bitsB 405 and determines whether the input address 401 is within the address range of device B. If the input address 401 is within the address range of device B, the output of the comparator 420, DestinationB 495, goes high to allow the data to go to device B. DestinationB 495 also goes to the comparator 430 via the OR gate 440 to disable the comparator 430.

In one embodiment, the outputs of the comparators 410 and 420 are coupled to inputs of the OR gate 440. If the input address is not within the address range of device A or the address range of device B, then the outputs of the comparators 410 and 420 go low, i.e., both DestinationA 493 and DestinationB 495 go low. DestinationA 493 and DestinationB 495 are input to the OR gate 440, and therefore, the output of the OR gate 440 goes low to enable the comparator 430. The comparator 430 compares the input address 401 with cfg_bitsC 407 to determine whether the input address 401 is within the address range of device C. If so, the output of the comparator 430, DestinationC 497, goes high to allow the data to go to device C.

Figure 4B:
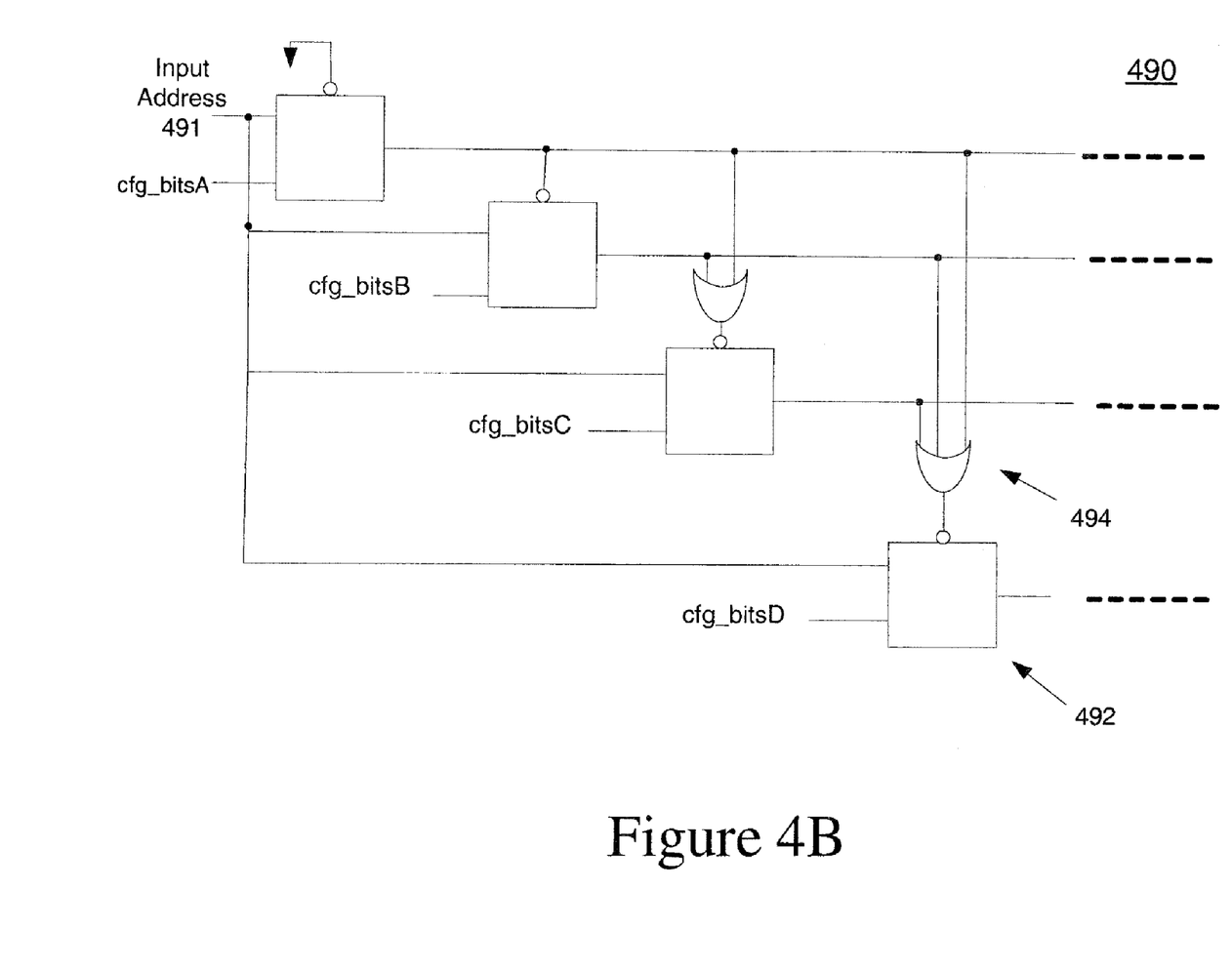
FIG. 4B shows an alternate embodiment of a prioritized address decoder.

In an alternate embodiment, the prioritized address decoder includes a different number of comparators, such as, for example, 2, 4, 5, etc., that may depend on the number of devices in the system that have associated address ranges. In one embodiment, there is one comparator for each device in the computer system. FIG. 4B shows one embodiment of a prioritized address decoder 490. Referring to FIG. 4B, the comparators 492 are arranged in series with the OR gates 494 coupled in between the comparators 492. The comparators 492 compare the input address 491 to address ranges corresponding to devices in the computer system one by one. When one of the comparators 492 determines that the input address 491 is within the address range associated with the comparator, the comparator disables the remaining comparators in the series. For example, in one embodiment, the decoder includes N comparators arranged in a series. When the kth comparator determines that the input address 491 is within the address range associated with the kth comparator, the (k+1)th through Nth comparators will be disabled. It should be apparent to one of ordinary skill in the art that the logic configuration disclosed can be extended to any number of comparators. The embodiments shown are merely for illustrating the concept, and thus, these embodiments should not be construed to limit the appending claims to any particular number of comparators.

In one embodiment, the comparators are arranged in a sequence such that the comparators assigned to the trusted agents are enabled before the comparators assigned to the non-trusted agents. Such arrangement prevents the non-trusted agents with an address range overlapping the address range of a trusted agent from accessing secured data that is to be sent to the trusted agent. It is because the comparator assigned to the trusted agent disables the comparator assigned to the non-trusted agent when the destination address of the data falls within the address range of the trusted agent. For example, referring back to FIG. 4A, suppose device A is a trusted agent and device B is a non-trusted agent, where the address range of device B overlaps with the address range of device A at the address 401. The comparator 410 checks the address 401 and generates an output to allow the data to go to device A and to disable the remaining comparators 420 and 430. Since the comparator 420, which is assigned to device B, is disabled, the data is not allowed to be sent to device B. Therefore, the prioritized address decoder 400 prevents device B from stealing the secured data from the computer system.

Figure 4C:
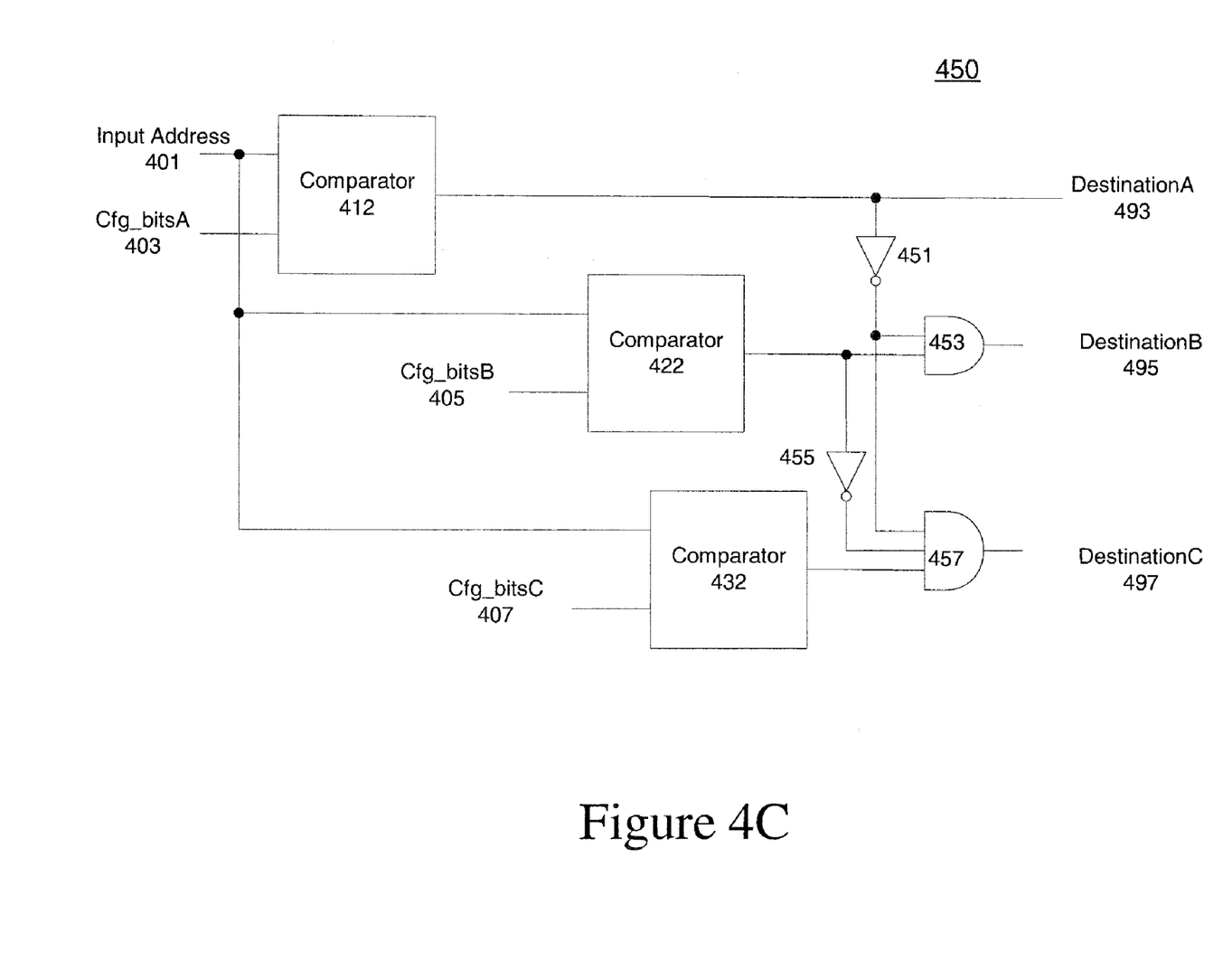
FIG. 4C shows one embodiment of a prioritized address decoder.

FIG. 4C shows an alternate embodiment of a prioritized address decoder 450. Decoder 450 includes address comparators 412, 422, and 432, AND gates 453 and 457, and inverters 451 and 455. The address comparators 410-430 compare an input address 401 with cfg_bitsA 403, cfg_bitsB 405, and cfg_bitsC 407, respectively. Each of cfg_bitsA 403, cfg_bitsB 405, and cfg_bitsC 407 is associated with an address range of a device in a computer system. The output of the comparator 410 is DestinationA 493, which is input to the inverter 451. The output of the inverter 451 and the output of the comparator 422 are input to the AND gate 453. The output of the comparator 422 is also input to the inverter 455. The output of the inverter 455, the output of the inverter 451, and the output of the comparator 432 are input to the AND gate 457. The outputs of the AND gates 453 and 457 are DestinationB 495 and DestinationC 497, respectively. DestinationA 493, DestinationB 495, and DestinationC 497 allow data to be sent to the devices having address ranges associated with cfg_bitsA 403, cfg_bitsB 405, and cfg_bitsC 407, respectively.

In one embodiment, a comparator outputs a signal at high level and allows data to be sent to the device associated with the address range when the input address 401 falls within the associated address range of a comparator. For example, if input address 401 falls within the address range associated with cfg_bitsA 403, comparator 412 outputs a signal at high level to allow the data to be sent to the device associated with cfg_bitsA 403. The output of comparator 412 is input via the inverter 451 to the AND gates 453 and 457. The inverter 451 inverts the output of comparator 412 from a high level to a low level, and therefore, forcing the outputs of both AND gates 453 and 457, i.e., DestinationB 495 and DestinationC 497, respectively, to be at low level, regardless of the other inputs to the AND gates 453 and 457. Therefore, the data would be sent to only the device associated with cfg_bitsA 403, not the devices associated with cfg_bitsB 405 and cfg_bitsC 407. One should appreciate that the embodiments described above are merely for illustrating the concept. Other embodiments may include different logic circuitries or configuration without going beyond the scope and boundary of the appended claims.

Figure 5:
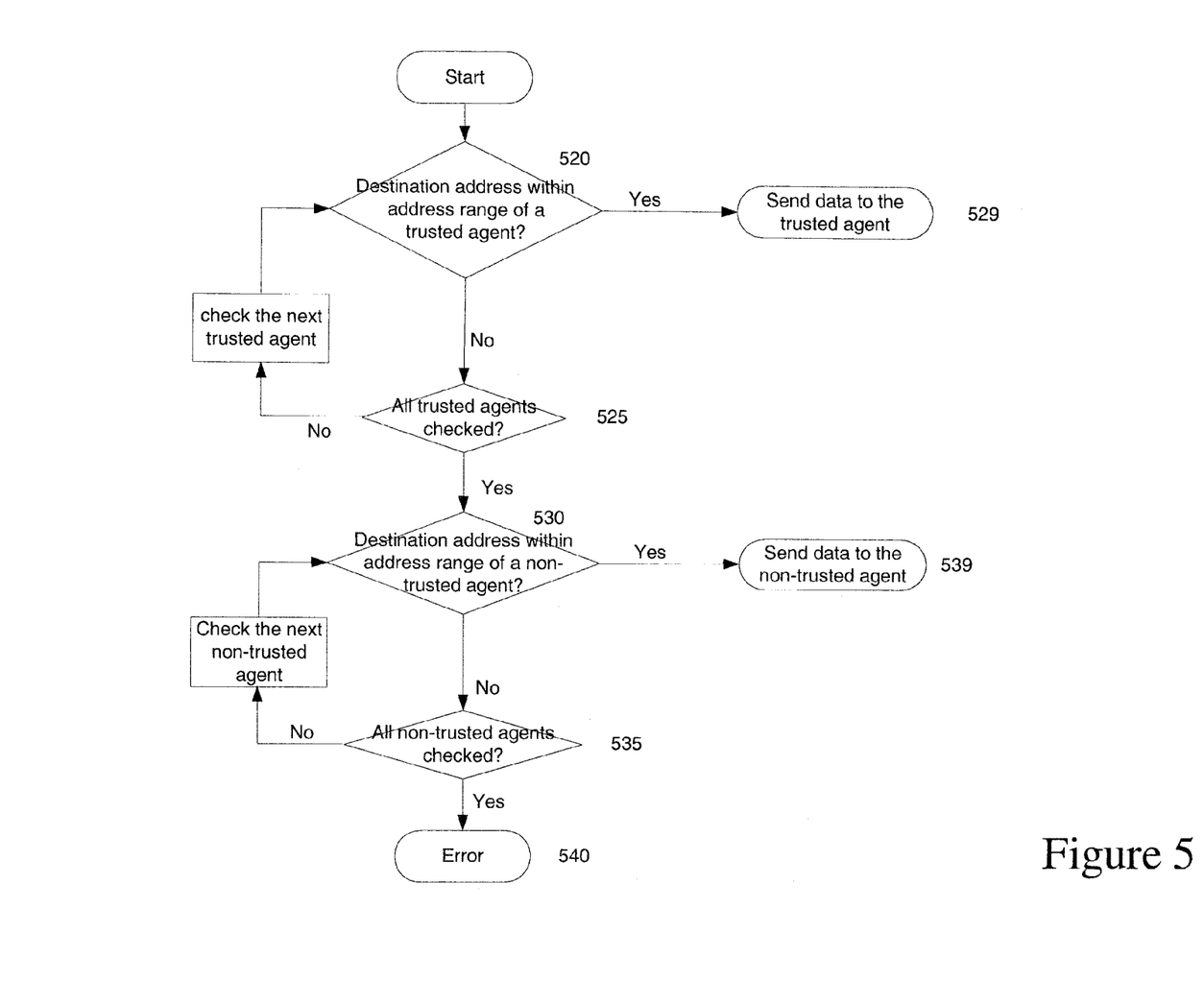
FIG. 5 shows a flow diagram of one embodiment of a process for routing data in a computer system.

FIG. 5 shows one embodiment of a process for routing data to a device within a computer system. The process is performed by processing logic that may comprise hardware (e.g., circuitry, dedicated logic, etc.), software (such as is run on a general purpose computer system or a dedicated machine), or a combination of both. Referring to FIG. 5, a device is referred to as a trusted agent if it is safe to send secured data to the device. Otherwise, the device is referred to as a non-trusted agent. Processing logic determines whether the destination address of the data is within the address range of a trusted agent (processing block 520). If the destination address of the data is within the address range of the trusted agent, processing logic sends the data to the trusted agent and the process ends (processing block 529). Otherwise, processing logic determines whether all the trusted agents in the system have been checked (processing block 525). If there is at least one trusted agent not checked yet, processing logic repeats processing block 520 to check the remaining trusted agent(s). If all trusted agents have been checked, then processing logic moves on to check the non-trusted agents.

For a non-trusted agent, processing logic determines whether the destination address is within the address range of the non-trusted agent (processing block 530). If the destination address is within the address range of the non-trusted agent, processing logic sends the data to the non-trusted agent and the process ends (processing block 539). Otherwise, processing logic determines whether there is any non-trusted agent not checked yet (processing block 535). If there is a non-trusted agent not checked yet, processing logic repeats processing block 530 on the non-trusted agent until all non-trusted agents have been checked. If the destination address does not fall within the address range of any trusted or non-trusted agent, then processing logic flags an error (processing block 540).

Since processing logic checks all trusted agents before checking any non-trusted agent and stops looking for another agent when processing logic finds a trusted agent having an address range encompassing the destination address of the data, the data is not sent to a non-trusted agent even if the destination address is also within the address range of the non-trusted agent. Such address decoding mechanism prevents the non-trusted agent with an address range overlapping the address range of a trusted agent from accessing secured data going to the trusted agent.

Figure 6:
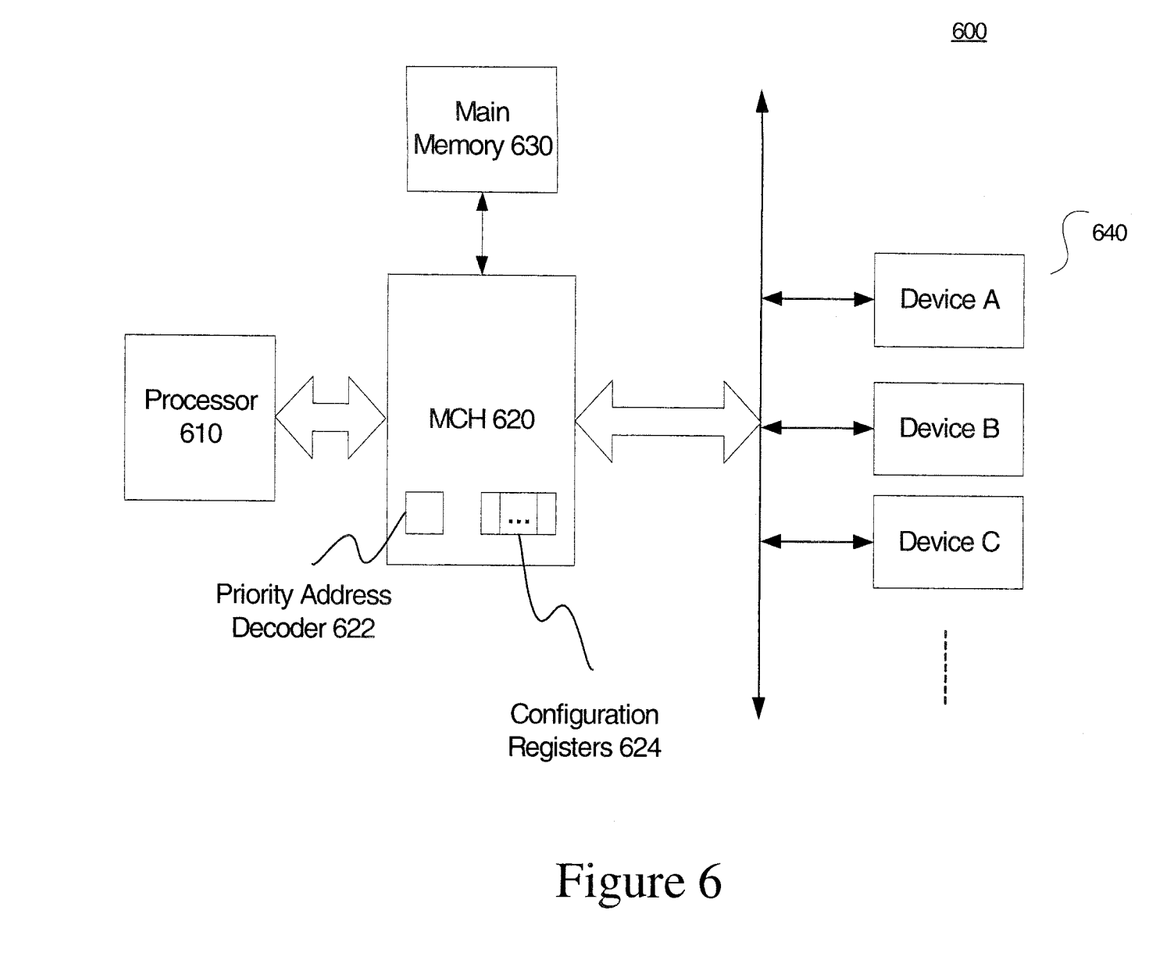
FIG. 6 shows an exemplary embodiment of a computer system.

FIG. 6 shows an exemplary embodiment of a computer system 600. The system 600 includes a processor 610, a MCH 620, a main memory 630, and a number of peripheral devices 640. In one embodiment, processor 610 includes a microprocessor, but is not limited to a microprocessor, such as, for example, Pentium®, Itanium®, PowerPC®, etc. Processor 610 is coupled to main memory 630. In one embodiment, main memory 630 includes a random access memory (RAM), or other dynamic storage device, such as, for example, a dynamic random access memory (DRAM), to store data and instructions to be executed by processor 610. The data and instructions are routed between processor 610, main memory 630, and other peripheral devices 640 via MCH 620.

In one embodiment, MCH 620 includes a priority address decoder 622 and a set of configuration registers 624 to route data between the devices of computer system 600. Some of the devices are referred to as trusted agents because it is safe to send secured data to these devices. The remaining devices are referred to as non-trusted agents. For example, in one embodiment, main memory 630, processor 610, and device A are trusted agents, while device B and device C are non-trusted agents.

To prevent routing secured data to non-trusted agents, MCH 620 checks the destination address of the secured data with the priority address decoder 622. In one embodiment, the address ranges of both the trusted and non-trusted agents are stored in the configuration registers 624. In one embodiment, the configuration registers 624 are set during configuration of various devices of the computer system 600. The contents of the configuration registers 624 may be modified during execution of certain software applications. In one embodiment, the configuration registers 624 are locked during a trusted mode to prevent unauthorized modification of the contents of the registers 624.

In one embodiment, the priority address decoder 622 checks the address ranges of the trusted agents one by one. In one embodiment, the priority address decoder 622 includes one comparator for each device in the computer system to determine whether the destination address of the data falls within the address range of the device. The comparators may be arranged in a sequence such that all comparators corresponding to trusted agents are before the comparators for non-trusted agents. In one embodiment, when the priority address decoder 622 identifies the trusted agent with an address range encompassing the destination address, the corresponding comparator outputs a signal to disable the other comparators such that the secured data is allowed to go to only the trusted agent. When the decoder 622 determines that the destination address is not within the address range of any of the trusted agents, the decoder 622 checks the non-trusted agents. Hence, the decoder 622 prevents the secured data from going to a non-trusted agent with an address range overlapping the address range of a trusted agent.

Note that any or all of the devices of computer system 600 and associated hardware may be used in various embodiments of the present invention. However, it can be appreciated that other configurations of the computer system may include some or all of the devices.

The foregoing discussion merely describes some exemplary embodiments of the present invention. One skilled in the art will readily recognize from such discussion, the accompanying drawings and the claims that various modifications can be made without departing from the spirit and scope of the appended claims. The description is thus to be regarded as illustrative instead of limiting.

What is claimed is:

1. A prioritized address decoder comprising:
a first comparator associated with a trusted first destination device to compare a received destination device address for data with a first address range associated with the trusted first destination device, the first comparator sending the data to the first device if the destination device address is within the first address range; and
a second comparator associated with a non-trusted second destination device and coupled to the first comparator to compare the destination device address with a second address range associated with the non-trusted second device, wherein the second comparator sends the data to the second device only if the second comparator receives a first output of the first comparator, the first output indicating that the destination device address does not correspond to the first address range, wherein the first comparator disables the second comparator when the destination device address is within the first address range;
a third comparator coupled to the first and the second comparators to compare the destination device address with a third address range associated with a third device, wherein the data is sent to the third device only if the third comparator receives a third output of the third comparator, the third output indicating that the destination device address does not correspond to the second address range, wherein in the third comparator is disabled when the address is within either the first address range or the second address range.

2. The prioritized address decoder of claim 1, wherein if the first address range is associated with a first device of a computer system, then secured data in the computer system is authorized to be sent to the first device.

3. The prioritized address decoder of claim 1, wherein if the second address range is associated with a second device of a computer system, then the secured data is not authorized to be sent to the second device.

4. The prioritized address decoder of claim 1, wherein the comparators include a plurality of configuration bits corresponding to respective address ranges.

5. The method of claim 4, wherein the plurality of configuration bits are software configurable.

6. The method of claim 5, wherein the plurality of configuration bits are locked during a trusted mode.

7. A computer system comprising:
a dynamic random access memory (DRAM);
a memory controller coupled to the DRAM, the memory controller comprising a prioritized address decoder, the prioritized decoder including
a first comparator associated with a trusted first destination device to compare a received destination device address for data with a first address range associated with the trusted first destination device, the first comparator sending the data to the first device if the destination device address is within the first address range; and a second comparator associated with a non-trusted second destination device and coupled to the first comparator to compare the destination device address with a second address range associated with the non-trusted second device, wherein the second comparator sends the data to the second device only if the second comparator receives a first output of the first comparator, the first output indicating that the destination device address does not correspond to the first address range, wherein the first comparator disables the second comparator when the destination device address is within the first address range;

a third comparator coupled to the first and the second comparators to compare the destination device address with a third address range associated with a third device, wherein the data is sent to the third device only if the third comparator receives a third output of the third comparator, the third output indicating that the destination device address does not correspond to the second address range, wherein in the third comparator is disabled when the address is within either the first address range or the second address range.

8. The computer system of claim 7, further comprising a processor coupled to the memory controller, wherein the trusted agent is the processor.

9. The computer system of claim 7, wherein the second address range is associated with agents coupled to an external bus.

10. The computer system of claim 7, wherein the memory controller further comprises a plurality of configuration registers storing information on the first and the second address ranges.

11. The computer system of claim 10, wherein the information is stored in the plurality of configuration registers during configuration.

12. The computer system of claim 10, wherein the plurality of configuration registers are locked during a trusted mode.

* * * * *